(12) United States Patent
Bakx

(10) Patent No.: US 6,583,396 B2
(45) Date of Patent: Jun. 24, 2003

(54) OPTICAL TRANSDUCER AND RECORDING/PLAYBACK DEVICE COMPRISING THE TRANSDUCER

(75) Inventor: Johannus Leopoldus Bakx, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 104 days.

(21) Appl. No.: 09/775,844

(22) Filed: Feb. 2, 2001

(65) Prior Publication Data

US 2001/0015403 A1 Aug. 23, 2001

(30) Foreign Application Priority Data

Feb. 11, 2000 (EP) .............................. 00200475

(51) Int. Cl.$^7$ ................................ G02B 7/04
(52) U.S. Cl. .............................. 250/201.5; 250/214 R; 369/44.41
(58) Field of Search ......................... 250/201.5, 214 R, 250/214.1; 369/44.32, 44.41, 44.42, 44.14, 44.11, 44.25

(56) References Cited

U.S. PATENT DOCUMENTS

| | | | | |
|---|---|---|---|---|
| 3,835,255 A | * | 9/1974 | Bauer | ........................ 369/174 |
| 5,798,989 A | * | 8/1998 | Shodo | ...................... 369/44.41 |
| 5,828,637 A | * | 10/1998 | Kim | ........................ 369/44.25 |
| 5,939,714 A | * | 8/1999 | Park | ........................ 250/201.5 |

* cited by examiner

Primary Examiner—Que T. Le
(74) Attorney, Agent, or Firm—Michael E. Belk

(57) ABSTRACT

An optical transducer according to the invention comprises optical detection means (1) including a first ($1_A$), a second ($1_B$), a third ($1_C$) and a fourth optical detector ($1_D$), such that a first imaginary line (2a) from the third optical detector ($1_C$) to the first optical detector crosses a second imaginary line (2b) from the second optical detector ($1_B$) to the fourth optical detector ($1_D$). The optical detectors generate detection signals (A,B,C,D) in response to an intensity of radiation incident thereon. The optical transducer further comprises signal combination means (4) for generating a first, a second, a third and a second combination signal. The first and the second combination signals (AC+, AC−) are indicative for the sum of the electrical detection signals (A,C) of the first ($1_A$) and the third optical detector ($1_C$). The third (BD+) and the fourth combination signal (BD−) each are indicative for the sum of the electrical detection signals (B,D) of the second ($1_B$) and the fourth optical detector ($1_D$). The first (AC+) and the second combination signal (AC−) have a mutually opposite phase. The third (BD+) and the fourth combination signal (BD−) also have a mutually opposite phase.

15 Claims, 4 Drawing Sheets

| Mode | M0 (Open Interface) | M1 (CD) | M2 (CDR/RW) | M3 (DVD) |
|---|---|---|---|---|
| S1 | 0 | 1 | 0 | 1 |
| S2 | 0 | 0 | 1 | 1 |
|  |  |  |  |  |
| $RF_1+$ | VR+ (A+B+C+D) | VR+ (A+B+C+D) | VR+ (A+B+C+D) | VR+ (A+C) |
| $RF_1-$ | E | VR- (A+B+C+D) | VR- (A+B+C+D) | VR- (A+C) |
| $RF_2+$ | F | E+F | E+G | VR+ (B+D) |
| $RF_2-$ | G | G+H | F+H | VR- (B+D) |
| VA | A | A | A | A |
| VB | B | B | B | B |
| VC | C | C | C | C |
| VD | D | D | D | D |
| VP | H | - | - | - |
|  |  |  |  |  |
| TM | several | 3-spots CA | 3-spots PP | DPD |

FIG. 3

OPTICAL TRANSDUCER AND RECORDING/PLAYBACK DEVICE COMPRISING THE TRANSDUCER

FIELD OF THE INVENTION

The invention relates to an optical transducer comprising optical detection means including a first, a second, a third and a fourth optical detector, such that a first imaginary line from the third optical detector to the first optical detector crosses a second imaginary line from the second optical detector to the fourth optical detector which optical detectors generate detection signals in response to an intensity of radiation incident thereon, the optical transducer further comprising signal combination means for generating a combination signal which is indicative for a sum of electrical detection signals.

The invention further relates to a recording/playback device comprising the transducer.

BACKGROUND OF THE INVENTION

A transducer as described in the opening paragraph is used in commercially available CD-players. In the known transducer, the combination means generate a combination signal which is indicative for the sum of the detection signals of the first, the second, the third and the fourth detector. This signal as well as four signals indicative for the detection signals of each of the detectors are provided via a flexible cable to a signal processing unit. The combination signal serves as an input signal for a data retrieval unit comprising bit detection means, channel decoding means and error correction decoding means. The four signals indicative for the detection signals are used to calculate a DPD tracking signal.

SUMMARY OF THE INVENTION

It is a problem that the known optical transducer is not suitable for high data speeds. E.g. for reading DVD at 20X it would be necessary to transport 5 signals having a frequency of 180 MHz via the flexible cable. Interference could be reduced by transporting each of the signals in the form of two output signals being mutually in counterfase. However this would require a relatively large number of conductors, only for these signals.

It is a purpose of the invention to provide a transducer according to the opening paragraph, which is suitable for use at high data-speeds, while requiring a relatively small number of output signals. For this purpose the optical transducer according to the invention is characterized in that the combination signal is indicative for the sum of the electrical detection signals of the first and the third optical detector the signal combination means further being comprised for generating a first, a second and a third additional combination signal, the first additional combination signal also being indicative for the sum of the electrical detection signals of the first and the third optical detector, the first additional combination signal and the combination signal having a mutually opposite phase, the second and the third additional combination signal each being indicative for the sum of the electrical detection signals of the second and the fourth optical detector, the second and a third additional combination signal having a mutually opposite phase.

In the transducer according to the invention only four conductors are necessary to transport the two detection signals. Despite this, the two detection signals can be used both for track detection by means of the DPD-method and for data retrieval. The individual detection signals, which may be used for generating a focus error signal, may be transported at a relatively low speed, e.g. at a third or a fourth of the speed of the detection signals. These signals therefore may be transported each by a single conductor.

Preferably the optical detection means further comprise a fifth optical detector which is arranged in a direction from the first and the fourth detector to the second and the third detector of an imaginary line beside the second and the third optical detector and a sixth optical detector arranged in said direction beside the fifth optical detector, the detection means further comprising a seventh optical detector arranged in a direction opposite the first direction beside the first and the fourth optical detector, as well as an eighth optical detector arranged in a direction opposite the first direction beside the seventh optical detector.

The additional fifth until the fourth detector enable other tracking methods, e.g. the three spots central aperture or the three spots push pull tracking method.

A preferred embodiment of the optical transducer according to the invention is characterized by input means for receiving one or more mode selection signals, mode selection means responsive to the one or more selection signals, which mode selection means enable a plurality of operational modes, in which at least one output signal is a selectable function of one or more of the electrical signals generated by the optical detectors. In this embodiment the optical transducer can be adapted for different applications, e.g. CD, CDR/RW or DVD while the number of connections can be limited.

In an implementation of this embodiment the optical transducer is characterized by a first until an eighth output signal, the optical transducer having an operational mode (M1), wherein the first and the second output signal each are representative for the sum of the electrical signals of the first until the fourth detector, the first and the second output signal being of opposite phase, the third output signal being representative for the sum of the electrical signals of the seventh and the eighth detector, the fourth output signal being representative for the sum of the electrical signals of the fifth and the sixth detector, the fifth until the eighth output signal respectively being representative of the electrical signals of the first until the fourth detector.

In this operational mode the optical transducer is in particular suitable for reading CD. The first and the second output signal can serve as input signals for a data retrieval unit. The third and the fourth output signals can serve as satellite signals for a three spot central aperture detection method.

A further implementation of the above described preferred embodiment is characterized by a first until an eighth output signal, the optical transducer having an operational mode (M2), wherein the first and the second output signal each are representative for the sum of the electrical signals of the first until the fourth detector, the first and the second output signal being of opposite phase, the third output signal being representative for the sum of the electrical signals of the fifth and the eighth detector, the fourth output signal being representative for the sum of the electrical signals of the sixth and the seventh detector, the fifth until the eighth output signal respectively being representative of the electrical signals of the first until the fourth detector.

In said operational mode the optical transducer is in particular suitable for recording and playback of CDR/RW. The first and the second output signals are suitable for data retrieval, while the third and the fourth output signals can be used to derive a tracking error signal by means of the three spots push-pull method.

A still further implementation of the optical transducer is characterized by a nignth output signal, the optical transducer having an operational mode (M0) wherein the first output signal is representative for the sum of the electrical signals of the first until the fourth detector, the second until the fourth output signal respectively are representative for the electrical signals of the eighth, the seventh and the fifth detector, the fifth until the eighth output signal respectively being representative of the electrical signals of the first until the fourth detector, the ninth output signal being representative of the electrical signal of the sixth optical detector.

An interface with this set of output signals is a defacto standard. In this operational mode the optical transducer can be used in conventional products.

These and other aspects of the invention are described in more detail with reference to the drawings. Therein:

BRIEF DESCRIPTION OF THE DRAWING

FIG. 3 shows an overview of a plurality of operational modes of the optical transducer.

DETAILED DESCRIPTION OF THE INVENTION

Figure 1:
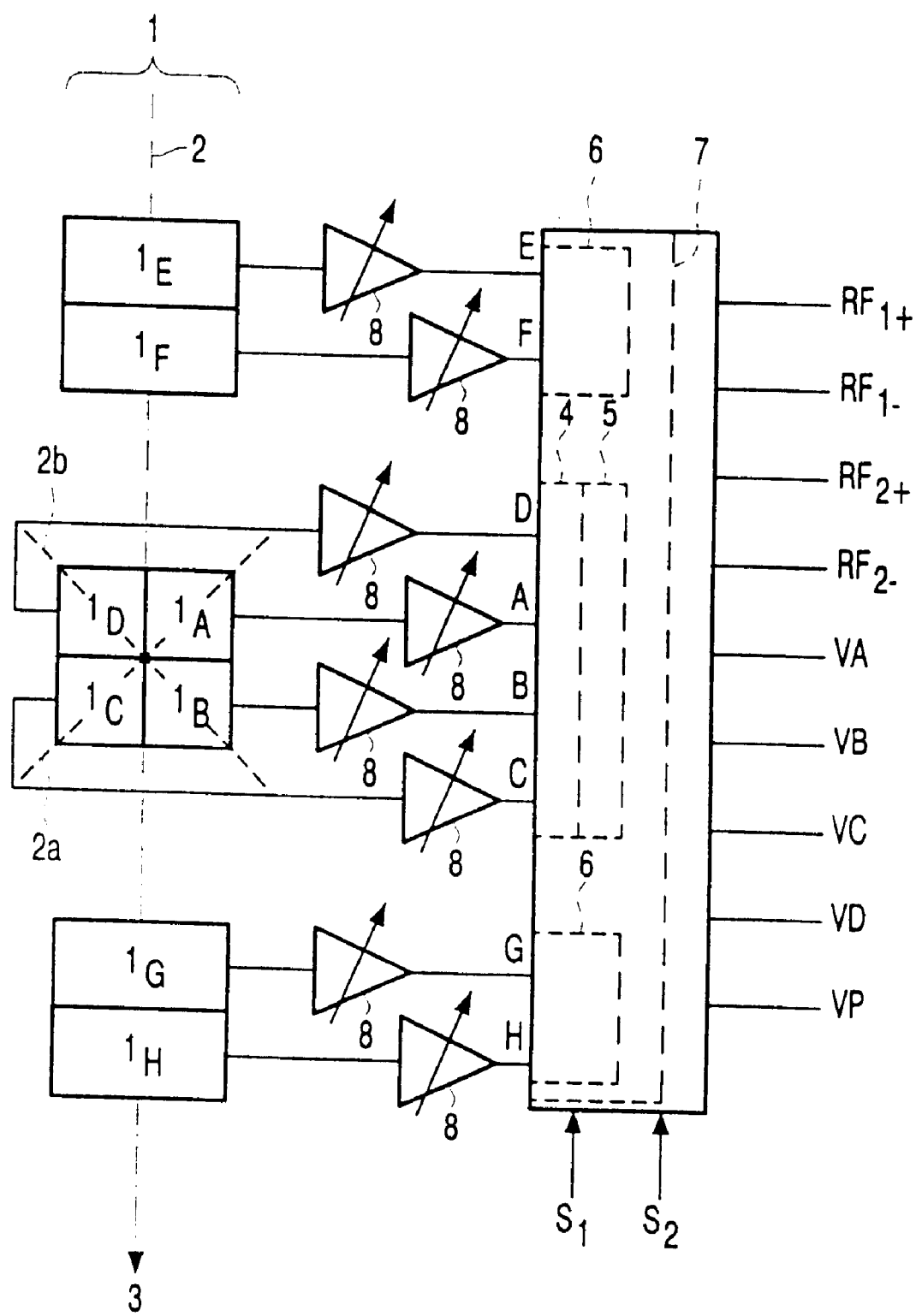
FIG. 1 shows an embodiment of an optical transducer according to the invention.

FIG. 1 shows an embodiment of an optical transducer according to the invention. The optical transducer comprising optical detection means 1 including a first 1A and a second optical detector 1B next to each other on a first side of an imaginary line 2 which extends in a first direction 3. The detection means 1 further include a third 1C and a fourth optical detector 1D on the other side of the line 2. The third optical detector 1C is arranged next to the second optical detector 1B and the fourth optical detector 1D is arranged next to the first optical detector 1A. A first imaginary line 2a from the first 1A to the third detector 1C crosses a second imaginary line 2b from the second 1B to the fourth detector 1D. The optical detectors 1A, . . . , 1D generate detection signals A, . . . ,D in response to an intensity of light incident thereon. The detection signals A, B, C, D are pre-amplified by variable gain amplifiers 8. The optical transducer further comprises signal combination means 4 and further signal combinations means 5, still further signal combination means 6 and signal selection means 7.

An implementation of the embodiment of FIG. 1 is described in more detail with reference to FIG. 2. The optical transducer comprises the combination means 4 for generating a combination signal AC+ which is indicative for the sum of the electrical detection signals A,C of the first $1_A$ and the third optical detector $1_C$. The optical transducer also comprises the signal combination means 4 for generating a first AC−, a second BD+ and a third additional combination signal BD+. The first additional combination signal AC− is also indicative for the sum of the electrical detection signals A,C of the first $1_A$ and the third optical detector $1_C$. The first additional combination signal AC− and the combination signal AC have a mutually opposite phase. The second BD+ and the third additional combination signal BD− each are indicative for the sum of the electrical detection signals B, D of the second $1_B$ and the fourth optical detector $1_D$. The second BD+ and the third additional combination signal BD− have a mutually opposite phase.

Figure 2:
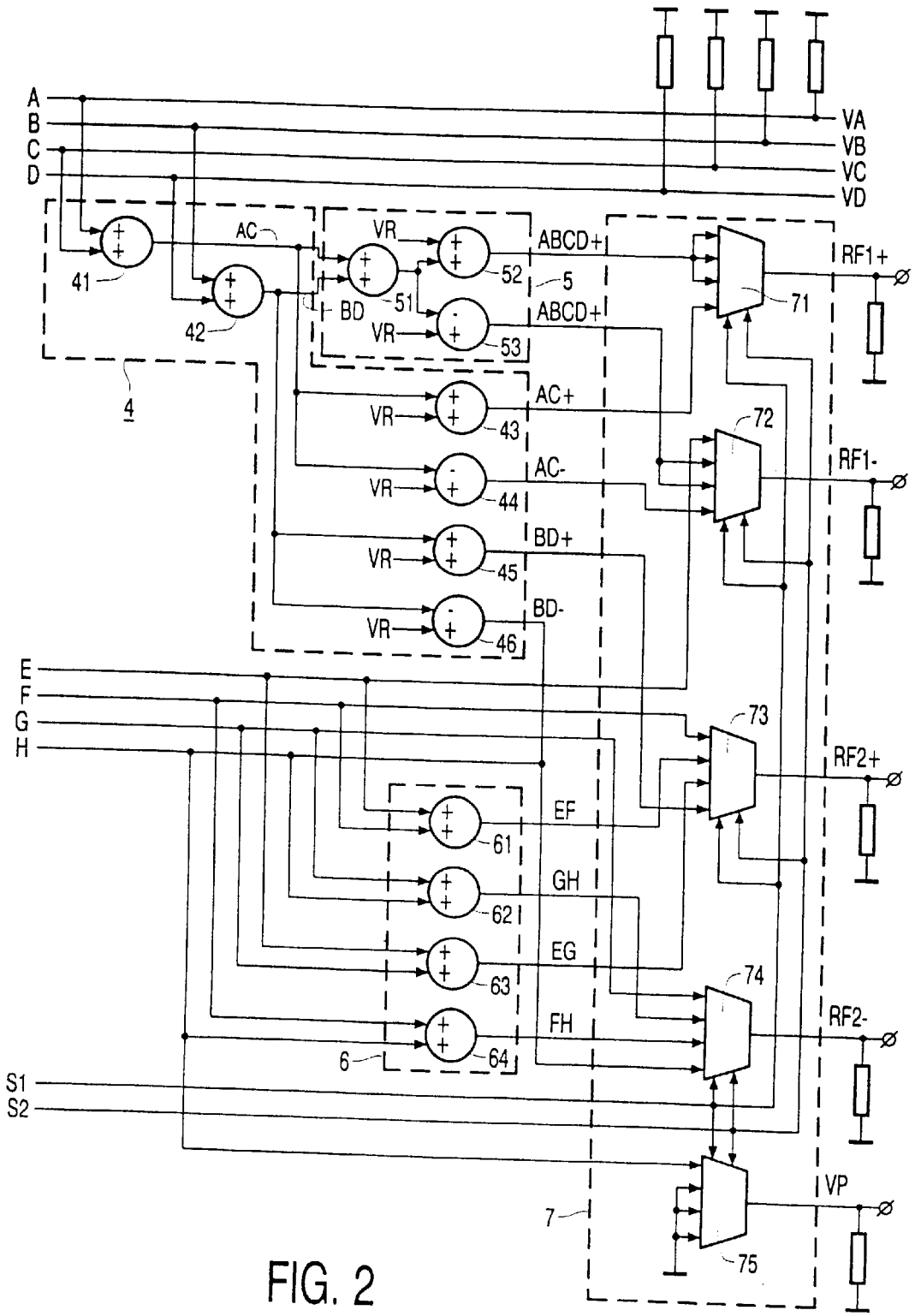
FIG. 2 shows a in more detail a portion of the embodiment of FIG. 1.

As shown in FIG. 2, the signal combination means 4 include a first addition element 41 for generating a first intermediary signal AC and a second addition element 42 for generating a second intermediary signal BD. The signal combination means 4 further include a third addition element 43 for generating the combination signal AC+ from the first intermediary signal AC and a reference value VR. The signal combination means 4 also include a first subtraction element 44 for generating the combination signal AC− from the first intermediary signal AC and the reference value VR. The signal combination means 4 further include a fourth addition element 44 for generating the combination signal BD+ from the second intermediary signal BD and the reference value VR. The signal combination means 4 also include a second subtraction element 44 for generating the combination signal BD− from the second intermediary signal BD and the reference value VR. Different implementations of the signal combination means 4 are possible. E.g. instead of first adding the signals A and C and subsequently the reference value VR, the signal AC+ could also be obtained by interchanging these additions, or by performing the additions by one addition element.

In the embodiment illustrated in FIG. 2, the optical transducer comprises further signal combination means 5 for generating a fourth additional combination signal ABCD+ and a fifth additional combination signal ABCD−. The fourth and the fifth additional combination signal each are representative of the sum of the detection signals of the first $1_A$ until the fourth optical detector $1_D$. The fourth and the fifth combination signal have a mutually opposite phase. In this embodiment the further signal combination means 5 comprise a fifth addition element 51 for calculating an intermediary signal which is representative for the sum of the detection signals of the first $1_A$ until the fourth optical detector $1_D$. The signal combination means include a sixth addition element for generating the fourth additional combination signal ABCD+ from this intermediary signal and a reference value VR. The signal combination means also include a third subtraction element for generating the fifth additional combination signal ABCD− from said intermediary signal and the reference value VR. As discussed with reference to the combination means 4, the further combination means 5 may also be implemented in different ways.

In the embodiment shown in FIG. 1, the detection means 1 further include a fifth optical detector $1_G$ which is arranged in a first direction 3 of the imaginary line 2 beside the second $1_B$ and the third optical detector $1_C$. The detection means 1 further include a sixth optical detector $1_H$ arranged in the first direction beside the fifth optical detector $1_G$. The detection means 1 further include a seventh optical detector $1_F$ arranged in a direction opposite the first direction beside the first $1_A$ and the fourth optical detector $1_D$. The detection means also include an eighth optical detector $1_E$ arranged in a direction opposite the first direction 3 beside the seventh optical detector $1_F$.

As shown in FIG. 2 the optical detection means of FIG. 1 comprise still further combination means 6 including a seventh 61, an eighth 62, a ninth 63 and a tenth addition element 64. The seventh addition element 61 generates a combination signal EF which is representative for the sum of the detection signals E,F of the seventh $1_F$ and the eighth optical detector $1_E$. The eighth addition element 62 generates a combination signal GH which is representative for the sum of the detection signals G,H of the fifth $1_G$ and the sixth optical detector $1_H$. The ninth addition element 63 generates a combination signal EG which is representative for the sum of the detection signals E,G of the eighth $1_E$ and the fifth optical detector $1_G$. The tenth addition element 64 generates a combination signal FH which is representative for the sum of the detection signals F,H of the seventh $1_F$ and the sixth optical detector $1_H$.

The embodiment of the optical transducer of the invention shown in FIGS. 1 and 2 is characterized by input means, e.g. terminals, for receiving one or more selection signals S1, S2. As shown in FIG. 2, the optical transducer comprises mode selection means 7 which are responsive to the one or more selection signals S1, S2. The mode selection means 7 enable a plurality of operational modes, in which at least one output signal is a selectable function of one or more of the detection signals generated by the optical detectors $1_A, \ldots, 1_H$.

In the embodiment shown the mode selection means comprise a first until a fifth selection element 71, . . . 75. The first selection element 71 selects a signal as the output signal $RF_{1+}$. The second selection element 72 selects a signal as the output signal $RF_{1-}$. The third selection element 73 selects a signal as the output signal $RF_{2+}$. The fourth selection element 74 selects a signal as the output signal $RF_{2-}$ and the fifth selection element selects a signal as the output signal VP. The selection elements are controlled by the selection signals S1, S2. The output signals $RF_{1+}$, $RF_{1-}$, $RF_{2+}$ and $RF_{2-}$ which are selected Preferably the combination means 4 operate in the analog current domain. In that case the addition elements can be implemented as a node in which the currents to be added are merged. However the addition elements 41, 42 could also be implemented as voltage adders. Furthermore the combination means could be implemented by digital elements.

The mode selection means 7 enable the optical transducer to assume one of a plurality of operational modes. The mode which is selected as a function of the selection signals S1, S2 is illustrated with reference to FIG. 3.

In the embodiment shown, the combination of input signals S1=1, S2=0 has the effect that the optical transducer assumes a first operational mode M1. This operational mode is in particular intended for playing back record carriers according to the CD standard. In that mode the optical transducer has a first until an eighth output signal $RF_{1+}$, $RF_{1-}$, $RF_{2+}$, $RF_{2-}$, VA, VB, VC and VD. The output VP of the transducer is kept to ground. The first $RF_{1+}$ and the second output signal $RF_{1-}$ each are representative for the sum of the electrical signals A, B, C, D of the first until the fourth detector $1_A, 1_B, 1_C, 1_D$, the first $RF_{1+}$ and the second output signal $RF_{1-}$ are of opposite phase. In casu the first output signal $RF_{1+}$ is equal to VR+(A+B+C+D) and the second output signal $RF_{1-}$ is equal to VR−(A+B+C+D). From these two signals $RF_{1+}$, $RF_{1-}$ the information stored at the record carrier can be retrieved. In this first operational mode M1 the third output signal $RF_{2+}$ is representative for the sum E+F of the electrical signals F, E of the seventh $1_F$ and the eighth detector $1_E$. The fourth output signal $RF_{2-}$ representative for the sum G+H of the electrical signals G, H of the fifth $1_G$ and the sixth detector $1_H$. The signals $RF_{2+}$ and $RF_{2-}$ may serve as satellite signals for generating the 3-spots central aperture tracking signal. Furthermore the fifth until the eighth output signal VA, VB, VC, VD respectively being representative of the electrical signals A, B, C, D, of the first until the fourth detector $1_A, 1_B, 1_C, 1_D$. From these four output signals can be used for generating a focus error signal FE. Preferably the focus error signal FE is calculated according to $$FE = \frac{VB - VA}{VB + VA} + \frac{VC - VD}{VC + VD}$$

The signals $RF_{2+}$ and $RF_{2-}$, as well as the signals VA, . . . , VD can have a relatively low bandwidth in comparison to the signals $RF_{1+}$ and $RF_{1-}$.

In the above described embodiment also a second operational mode M2 is selectable, which is in particular suitable for writable CD formats, e.g. CDR or CDRW. The optical transducer assumes this operational mode M2 when the input signals S1, S2 respectively have the values 0 and 1. In this operational mode M2, the first $RF_{1+}$ and the second output signal $RF_{1-}$ each are representative for the sum A+B+C+D of the electrical signals A, B, C, D of the first until the fourth detector $1_A, 1_B, 1_C, 1_D$ in the same way as described with reference to the first operational mode M1. In the second operational mode M2 the third output signal $RF_{2+}$ is representative for the sum G+E of the electrical signals G, E of the fifth $1_G$ and the eighth detector $1_E$. The fourth output signal $RF_{2-}$ is representative for the sum H+F of the electrical signals H, F of the sixth $1_H$ and the seventh detector $1_F$. As in the first operational mode, the signals $RF_{1+}$ and $RF_{1-}$ can be used for retrieving the information signal. The signals $RF_{2+}$ and $RF_{2-}$ can be used for deriving an information signal representative of information present at the record carrier. The combination of output signals $RF_{1+}$, $RF_{1-}$, $RF_{2+}$, $RF_{2-}$ is suitable for generating a three spots push-pull signal according to:

$$RE = RF_{1+} - RF_{1-} - \Gamma(RF_{2+} - RF_{2-})$$

therein $\Gamma$ is a scaling factor for compensating for the differences in intensity between the central spot and the satellite spots.

In the second operational mode M2, the fifth until the eighth output signal VA, VB, VC, VD respectively are representative of the electrical signals of the first until the fourth detector $1_A, 1_B, 1_C, 1_D$, in the same way as in the first operational mode M1.

The optical transducer assumes a third operational mode M3 when the input signals S1, S2 each have a logical value 1. This operational mode is in particular suitable for recording and playback of record carriers according to the DVD format. In this operational mode M3 the first $RF_{1+}$ and the second output signal $RF_{1-}$ each are representative for the sum A+C of the electrical signals A,C of the first $1_A$ and the third detector $1_C$. The first $RF_{1+}$ and the second output signal $RF_{1-}$ are of opposite phase. In casu the first output signal $RF_{1+}$ is equal to VR+A+B, VR being a reference value and the second output signal $RF_{1-}$ is equal to VR−A−B. The third $RF_{2+}$ and the fourth output signal $RF_{2-}$ each are representative for the sum of the electrical signals C+D of the second $1_C$ and the fourth detector $1_D$. The third $RF_{2+}$ and the fourth output signal $RF_{2-}$ are of opposite phase. In casu the third output signal $RF_{2+}$ is equal to VR+C+D, and the second output signal $RF_{2-}$ is equal to VR−C−D. The fifth until the eighth output signal VA VB, VC, VD respectively are representative of the electrical signals A, B, C, D of the first until the fourth detector $1_A, 1_B, 1_C, 1_D$, in the same way as in the other operational modes M1, M2.

Both a central aperture signal CA can be derived from the first until the fourth output signal according to:

$$CA = RF_{1+} - RF_{1-} + RF_{2+} - RF_{2-}$$

Furthermore a first and second signal DPD1, DPD2 for generating a tracking error according to the DPD is obtained by $$DPD1 = RF_{1+} - RF_{1-}, \text{ and}$$

$$DPD2 = RF_{2+} - RF_{2-}$$

In addition a conventional operational mode M0 is selectable, by providing the input signal values S1=0, S2=0. In the standard operational mode the first output signal RF1+ is representative for the sum A+B+C+D of the electrical signals A, B, C, D of the first until the fourth detector $1_A$, $1_B$, $1_C$, $1_D$. In casu the first output signal $RF_{1+}$ is equal to VR+A+B+C+D. The second until the fourth output signal $RF_{1-}$, $RF_{2+}$, $RF_{2-}$ respectively are representative for the electrical signals E, F, G of the eighth $1_E$, the seventh $1_F$ and the fifth detector $1_G$. As in the other operational modes M1–M3 the fifth until the eighth output signal VA, VB, VC, VD respectively are representative of the electrical signals A, B, C, D of the first until the fourth detector $1_A$, $1_B$, $1_C$, $1_D$. In the conventional operational mode the optical transducer also provides a the nignth output signal VP which is representative of the electical signal H of the sixth optical detector $1_H$.

In the embodiment shown in FIG. 2 the outputs for delivering the output signals $RF_{1+}$, $RF_{1-}$ etc. are closed by resistive elements. The resistors serve as I-V conversion means.

Figure 4:
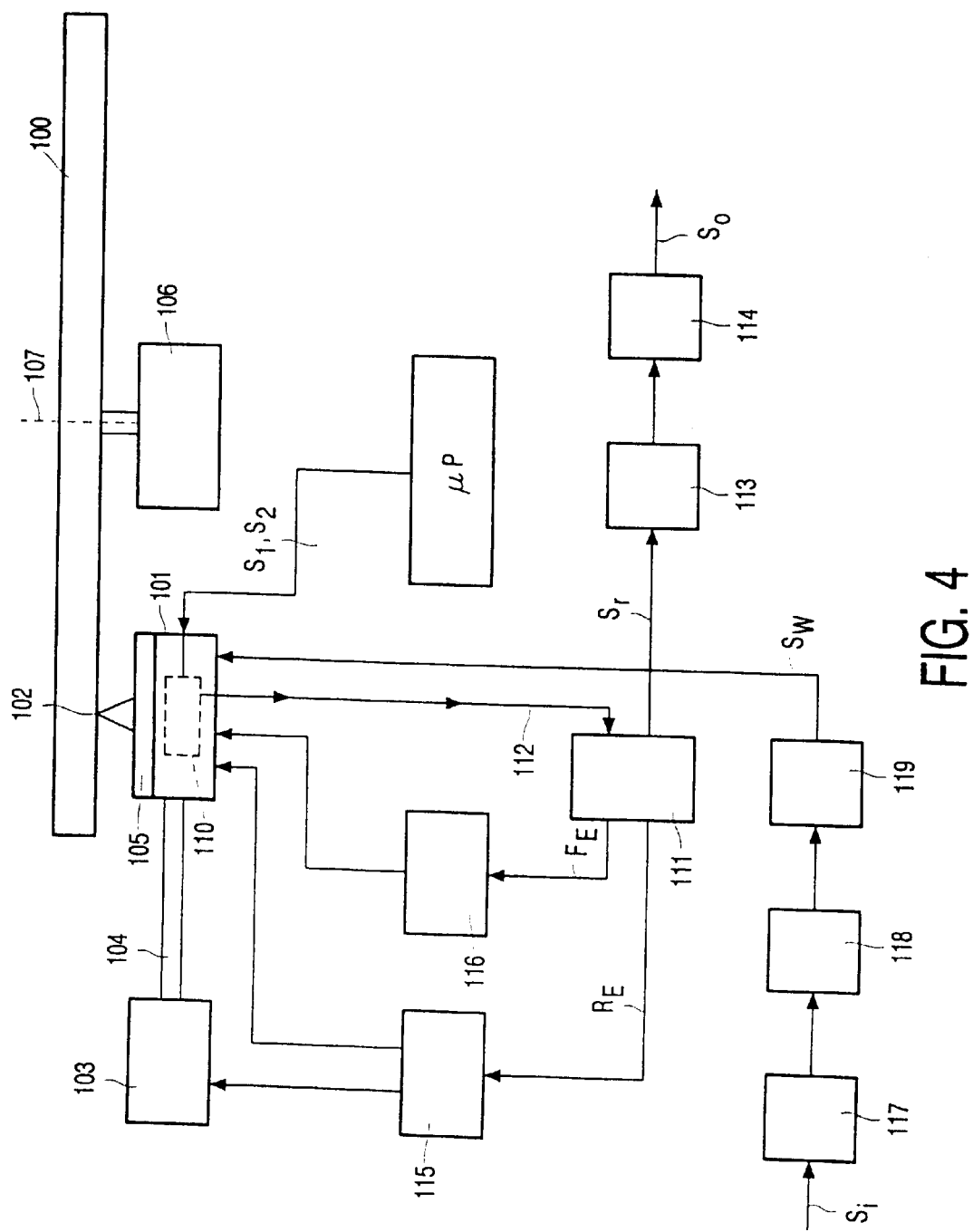
FIG. 4 shows a device for reading/writing a record carrier comprising the optical transducer.

FIG. 4 shows a device for recording and/or playing a record carrier 100, which is rotatble around an axis 107. The device comprises a write/read head 101 which includes an optical transducer 110 according to the invention. The write/read head also comprises an optical system for mapping at least one radiation beam via a scanning spot 102 at the record carrier 100 at the optical transducer. The device also comprises radial 103, 104, 105 and tangential displacement means 106 for displacing the scanning spot 102 with respect to the record carrier 100. The radial displacement means include course radial displacement means in the form of a motor 103 and a sledge 104 for radially moving the read/write head 101. The radial displacement means further include fine radial displacement means 105 for radially moving the scanning spot 102 with respect to the write/read head 101. The tangential displacement means are formed by a spindle motor 106 for rotating the record carrier around the axis 107. In another embodiment the record carrier is in the form of a card. In that embodiment the displacement means for example are formed by a pair of linear motors for linearly displacing the scanning spot in two mutually orthogonal directions.

The embodiment of the device according to the invention shown in Figure . . . comprises a signal processor 111 which is connected via a flexible cable 112 with the optical transducer 112. The cable 112 transports the signals $RF_{1+}$, $R_{F1-}$, $RF_{2+}$, $R_{F2-}$, VA, VB, VC, VD, VP. In response to these signals the signal processor 111 computes a read signal Sr. The read signal Sr is channel decoded by channel decoder 113 and error correction decoder 114 into an information output signal So. The signal processor 111 also provides a radial error signal RE and a focus error signal FE. The radial error signal RE forms an input signal for radial servo system, which controls the radial displacement means 103, 104 and 105. The focus error signal FE forms an input signal for a focus servo system 116 which is used to control a focus actuator (not shown).

The device shown in Figure also comprises an encoder 117 for encoding an input signal Si by means of an error correcting code. The so obtained signal is channel encoded by channel encoder 118. The device also comprises a write strategy generator which generates a write signal $S_W$.

What is claimed is:

1. An optical transducer comprising:
   optical detection means including a first, a second, a third and a fourth optical detector, arranged such that a first imaginary line from the third optical detector to the first optical detector crosses a second imaginary line from the second optical detector to the fourth optical detector which optical detectors generate detection signals in response to an intensity of radiation incident thereon; and
   signal combination means for generating a combination signal which is indicative of the sum of the electrical detection signals of the first and the third optical detector, the signal combination means generating a first, a second and a third additional combination signal, the first additional combination signal being indicative of the sum of the electrical detection signals of the first and the third optical detector, the first additional combination signal and the combination signal having a mutually opposite phase, the second and the third additional combination signal each being indicative of the sum of the electrical detection signals of the second and the fourth optical detector, the second and a third additional combination signal having a mutually opposite phase.

2. The optical transducer of claim 1, wherein the optical detection means further comprise a fifth optical detector which is arranged in a first direction from the first and the fourth detector to the second and the third detector beside the second and the third optical detector, a sixth optical detector arranged in the first direction beside the fifth optical detector, a seventh optical detector arranged in a direction opposite the first direction beside the first and the fourth optical detector, and an eighth optical detector arranged in the direction opposite the first direction beside the seventh optical detector.

3. The optical transducer of claim 2, further comprising: input means for receiving one or more mode selection signals; and mode selection means responsive to the one or more selection signals, which mode selection means enable a plurality of operational modes, in which one or more output signals are selectable functions of one or more of the electrical signals generated by the optical detectors.

4. The optical transducer of claim 3, having an operational mode, wherein the output signals include:
   a first and a second output signal each are representative of the sum of the electrical signals of the first to the fourth detector, the first and the second output signal being of opposite phase,
   a third output signal being representative of the sum of the electrical signals of the seventh and the eighth detector, and
   a fourth output signal being representative of the sum of the electrical signals of the fifth and the sixth detector.

5. The optical transducer of claim 3, having an operational mode, wherein the output signals include:
   a first and a second output signal each representative of the sum of the electrical signals of the first to the fourth detector, the first and the second output signal being of opposite phase,
   a third output signal being representative of the sum of the electrical signals of the fifth and the eighth detector, and
   a fourth output signal being representative of the sum of the electrical signals of the sixth and the seventh detector.

6. The optical transducer of claim 3, having an operational mode, wherein the output signals include:

a first and a second output signal each are representative of the sum of the electrical signals of the first and the third detector, the first and the second output signal being of opposite phase, and a third and a fourth output signal each being representative of the sum of the electrical signals of the second and the fourth detector, the third and the second output signal being of opposite phase.

7. The optical transducer of claim 3, having an operational mode wherein the output signals include:

a first output signal representative of the sum of the electrical signals of the first to the fourth detector, a second to a fourth output signal respectively are representative of the electrical signals of the eighth, the seventh and the fifth detector, and a further output signal being representative of the electrical signal of the sixth optical detector.

8. The optical transducer of claim 4, wherein a fifth to an eighth output signal respectively are representative of the electrical signals of the first to the fourth detector.

9. The optical transducer of claim 8, further comprising a first plurality of outputs having a relatively wide bandwidth and a second plurality of outputs having a relatively small bandwidth, the first plurality of outputs being selected for the output signals having a mutually opposite phase.

10. A device for recording and/or playing a record carrier comprising:

a write/read head which includes an optical transducer;

an optical system for mapping at least one radiation beam via a scanning spot at the record carrier at the optical detection means of the optical transducer; and displacement means for displacing the scanning spot with respect to the record carrier;

the optical transducer including:

optical detection means including a first, a second, a third and a fourth optical detector, such that a first imaginary line from the third optical detector to the first optical detector crosses a second imaginary line from the second optical detector to the fourth optical detector which optical detectors generate detection signals in response to an intensity of radiation incident thereon; and signal combination means for generating a combination signal which is indicative of a sum of the electrical detection signals of the first and the third optical detector, the signal combination means generating a first, a second and a third additional combination signal, the first additional combination signal being indicative of the sum of the electrical detection signals of the first and the third optical detector, the first additional combination signal and the combination signal having a mutually opposite phase, the second and the third additional combination signal each being indicative of the sum of the electrical detection signals of the second and the fourth optical detector, the second and a third additional combination signal having a mutually opposite phase.

11. The optical transducer of claim 1, characterized by input means for receiving one or more mode selection signals, mode selection means responsive to the one or more selection signals, which mode selection means enable a plurality of operational modes, in which at least one output signal is a selectable function of one or more of the electrical signals generated by the optical detectors.

12. The optical transducer of claim 5, wherein the fifth to the eighth output signal respectively are representative of the electrical signals of the first to the fourth detector.

13. The optical transducer of claim 6, wherein the fifth to the eighth output signal respectively are representative of the electrical signals of the first to the fourth detector.

14. The optical transducer of claim 7, wherein the fifth to the eighth output signal respectively are representative of the electrical signals of the first to the fourth detector.

15. The optical transducer of claim 1, wherein the optical detection means further comprise a fifth optical detector which is arranged in a first direction from the first and the fourth detector to the second and the third detector beside the second and the third optical detector, a sixth optical detector arranged in the first direction beside the fifth optical detector, a seventh optical detector arranged in a direction opposite the first direction beside the first and the fourth optical detector, and an eighth optical detector arranged in the direction opposite the first direction beside the seventh optical detector;

the optical transducer further comprising: input means for receiving one or more mode selection signals; and mode selection means responsive to the one or more selection signals, which mode selection means enable a plurality of operational modes, in which at least one output signal is a selectable function of one or more of the electrical signals generated by the optical detectors the optical transducer having an operational mode wherein a first and a second output signal each are representative of the sum of the electrical signals of the first to the fourth detector, the first and the second output signal being of opposite phase, a third output signal being representative for the sum of the electrical signals of the seventh and the eighth detector, and a fourth output signal being representative for the sum of the electrical signals of the fifth and the sixth detector;

the optical transducer having an operational mode wherein a first and a second output signal each are representative of the sum of the electrical signals of the first to the fourth detector, the first and the second output signal being of opposite phase, a third output signal being representative of the sum of the electrical signals of the fifth and the eighth detector, and a fourth output signal being representative of the sum of the electrical signals of the sixth and the seventh detector;

the optical transducer having an operational mode wherein a first and a second output signal each representative of the sum of the electrical signals of the first and the third detector, the first and the second output signal being of opposite phase, and a third and a fourth output signal each being representative of the sum of the electrical signals of the second and the fourth detector, the third and the second output signal being of opposite phase; and the optical transducer having an operational mode wherein a first output signal is representative of the sum of the electrical signals of the first to the fourth detector, a second to a fourth output signal respectively representative of the electrical signals of the eighth, the seventh and the fifth detector, and a further output signal being representative of the electrical signal of the sixth optical detector;

the fifth to the eighth output signal respectively are representative of the electrical signals of the first to the fourth detector; and the optical transducer wherein a first plurality of the outputs have a relatively wide bandwidth and a second plurality of the outputs have a relatively small bandwidth, the first plurality of outputs being selected for the output signals having a mutually opposite phase.

* * * * *